United States Patent
Omura et al.

(10) Patent No.: US 9,945,571 B2
(45) Date of Patent: Apr. 17, 2018

(54) ROOM PRESSURE CONTROL SYSTEM AND ROOM PRESSURE CONTROL METHOD

(71) Applicant: AZBIL CORPORATION, Chiyoda-ku (JP)

(72) Inventors: Rintaro Omura, Chiyoda-ku (JP); Yasuhito Omagari, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 228 days.

(21) Appl. No.: 15/054,237

(22) Filed: Feb. 26, 2016

(65) Prior Publication Data

US 2016/0252265 A1 Sep. 1, 2016

(30) Foreign Application Priority Data

Feb. 27, 2015 (JP) ................................. 2015-037750

(51) Int. Cl.
| | |
|---|---|
| G06F 19/00 | (2011.01) |
| F24F 11/00 | (2018.01) |
| B08B 15/02 | (2006.01) |
| F24F 11/04 | (2006.01) |

(52) U.S. Cl.
CPC .......... *F24F 11/0001* (2013.01); *B08B 15/02* (2013.01); *F24F 11/0079* (2013.01); *F24F 11/04* (2013.01); *F24F 2011/0042* (2013.01); *Y02B 30/746* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,920,488 A | * | 7/1999 | Arnold | G05D 7/0635 454/239 |
| 7,465,225 B2 | * | 12/2008 | Ohmura | F24F 3/161 454/187 |
| 2011/0300790 A1 | * | 12/2011 | Bauer | F24F 11/0076 454/239 |
| 2012/0270488 A1 | * | 10/2012 | Fujimura | F24F 11/0001 454/56 |

(Continued)

FOREIGN PATENT DOCUMENTS

| | | |
|---|---|---|
| JP | 2006-153325 | 6/2006 |
| JP | 2012-237527 | 12/2012 |

*Primary Examiner* — Kidest Bahta
(74) *Attorney, Agent, or Firm* — Oblon, McClelland, Maier & Neustadt, L.L.P.

(57) ABSTRACT

A room pressure control system includes an air supply valve, an exhaust valve, and controller circuits. One of the controller circuits includes a room pressure correction control circuit that controls the valve operating as a room pressure control valve, between the air supply valve and the exhaust valve, so that the room pressure coincides with a set room pressure value; and processing circuitry that determines whether the room pressure easily fluctuates, determines whether the room pressure is stable, and sets parameters. In particular, the processing circuitry sets a dead zone parameter with which responsiveness of room pressure control is valued when it is determined that the room pressure easily fluctuates and otherwise sets a dead zone parameter with which reduction in the number of operations of the room pressure control valve is valued above the responsiveness of the room pressure control.

11 Claims, 4 Drawing Sheets

(56) References Cited

U.S. PATENT DOCUMENTS

2012/0289139 A1* 11/2012 Fujimura ................. F24F 11/04
  454/61
2015/0362205 A1* 12/2015 Hung ...................... F25B 49/02
  454/238

* cited by examiner

ROOM PRESSURE CONTROL SYSTEM AND ROOM PRESSURE CONTROL METHOD

CROSS-REFERENCE TO RELATED APPLICATIONS

The present application claims priority to Japanese Application No. 2015-037750, filed Feb. 27, 2015, the entire contents of which are incorporated herein by reference.

BACKGROUND

Field

The present disclosure relates to a room pressure control system that keeps the pressure of a room constant through control of a supply air volume into the room and an exhaust air volume from the room.

Description of the Related Art

For example, in clean rooms in factories and laboratories, control is performed in which a room pressure (a differential pressure between rooms) is set for a room and the room pressure is kept constant to generate the air flow in an arbitrary direction for prevention of cross-contamination between rooms and assurance of safety by containment of hazardous substances.

Since it is necessary to frequently operate a room pressure control valve in order to keep the room pressure constant, there are problems in that the number of operations of the room pressure control valve is increased and the lifetime of the room pressure control valve is reduced.

Accordingly, in related art, provision of a control hold function while the room pressure is stable, in addition to a room pressure control function, to the room pressure control valve reduces the number of operations of the room pressure control valve and increases the lifetime of the room pressure control valve while the room pressure is kept constant (refer to Japanese Unexamined Patent Application Publication No. 2006-153325 and Japanese Unexamined Patent Application Publication No. 2012-237527). In the technologies disclosed in Japanese Unexamined Patent Application Publication No. 2006-153325 and Japanese Unexamined Patent Application Publication No. 2012-237527, dead zones are set around a set room pressure value and the operation of the room pressure control valve is stopped if a measured room pressure value is within the dead zones.

The steady short-period variation in the room pressure is naturally led to the original room pressure and the width of the variation is within a certain range in most cases. Accordingly, a dead zone width around the set room pressure value and a deviation time are set as dead zone parameters. If the measured room pressure value is within the range of the dead zone width or if the measured room pressure value has returned into the range of the dead zone width before the deviation time elapses even when the measured room pressure value has been out of the range of the dead zone width, the operation of the room pressure control valve is put on hold to increase the lifetime of the room pressure control valve.

Although the number of operations of the room pressure control valve is reduced and the lifetime of the room pressure control valve is increased with the technologies disclosed in Japanese Unexamined Patent Application Publication No. 2006-153325 and Japanese Unexamined Patent Application Publication No. 2012-237527, there are problems in that responsiveness of the control to fluctuation in the room pressure is reduced and the controllability of the room pressure is degraded.

SUMMARY

In one embodiment, there is provided a room pressure control system, comprising: (1) an air supply valve configured to adjust a volume of supply air to be blown into a target room; (2) a general exhaust valve configured to adjust a volume of exhaust air to be blown out from the target room; (3) an air volume control circuit configured to determine the supply air volume and the exhaust air volume and control the air supply valve and the general exhaust valve so that a difference between the supply air volume adjusted by the air supply valve and the exhaust air volume adjusted by the general exhaust valve coincides with a set offset air volume value; and (4) processing circuitry configured to (a) control a valve operating as a room pressure control valve, the valve being one of the air supply valve and the general exhaust valve, so that a room pressure, which is a difference between a pressure in the target room and a pressure in certain reference room, coincides with a set room pressure value; (b) determine whether the room pressure easily fluctuates; (c) determine whether the room pressure is stable; and (d) set parameters used to determine stability of the room pressure.

The processing circuitry is further configured to set a first dead zone parameter with which responsiveness of room pressure control is valued above a reduction in a number of operations of the room pressure control valve when the processing circuitry determines that the room pressure easily fluctuates, and set a second dead zone parameter with which the reduction in the number of operations of the room pressure control valve is valued above the responsiveness of the room pressure control when the processing circuitry determines that the room pressure does not easily fluctuate. Moreover, the processing circuitry is further configured to maintain a change in air volume for controlling the room pressure when the processing circuitry determines that the room pressure is stable.

DESCRIPTION OF THE EMBODIMENTS

Accordingly, it is an object of the present disclosure to provide a room pressure control system and a room pressure control method capable of achieving both the increase in the lifetime of the room pressure control valve and the responsiveness of the control by improving the responsiveness of the control to the fluctuation in the room pressure while keeping the increase in the lifetime of the room pressure control valve.

According to an embodiment of the present disclosure, a room pressure control system includes an air supply valve that adjusts an air volume of supply air to be blown into a target room; a general exhaust valve that adjusts an air volume of exhaust air to be blown out from the target room; an air volume control unit that determines the supply air volume from the air supply valve and the exhaust air volume from the general exhaust valve and controls the air supply valve and the general exhaust valve so that a difference between the supply air volume adjusted by the air supply valve and the exhaust air volume adjusted by the general exhaust valve coincides with a set offset air volume value; a room pressure correction control unit that controls the valve operating as a room pressure control valve, between the air supply valve and the general exhaust valve, so that a room pressure, which is a difference in pressure between the target room and a certain reference room, coincides with a set room pressure value; a room pressure ease-of-fluctuation determination unit that determines whether the room pressure easily fluctuates; a room pressure stability determination unit that determines whether the room pressure is stable; and a dead zone parameter setting unit that sets dead zone parameters used to determine stability of the room pressure. The dead zone parameter setting unit sets, in the room pressure stability determination unit, a dead zone parameter with which responsiveness of room pressure control is valued above reduction in the number of operations of the room pressure control valve if the room pressure ease-of-fluctuation determination unit determines that the room pressure easily fluctuates and sets, in the room pressure stability determination unit, a dead zone parameter with which the reduction in the number of operations of the room pressure control valve is valued above the responsiveness of the room pressure control if the room pressure ease-of-fluctuation determination unit determines that the room pressure does not easily fluctuate. The room pressure correction control unit holds change in the air volume for the room pressure control if the room pressure stability determination unit determines that the room pressure is stable.

In the room pressure control system, the dead zone parameters may include a dead zone width and a deviation time, and the room pressure stability determination unit may determine that the room pressure is stable if an absolute value of a deviation between the set room pressure value and a measured room pressure value is lower than or equal to the dead zone width and determines that the room pressure is being varied if a continuation time of a situation in which the absolute value of the deviation exceeds the dead zone width exceeds the deviation time.

In the room pressure control system, the dead zone width with which the responsiveness of the room pressure control is valued may be narrower than the dead zone width with which the reduction in the number of operations of the room pressure control valve is valued, and the deviation time with which the responsiveness of the room pressure control is valued may be shorter than the deviation time with which the reduction in the number of operations of the room pressure control valve is valued.

In the room pressure control system, the room pressure ease-of-fluctuation determination unit may determine that the room pressure easily fluctuates if at least one of conditions is established. The conditions includes (1) while the supply air volume or the exhaust air volume is being changed, (2) before a first predetermined time elapses after the room pressure control is started, and (3) a deviation in which the absolute value of the deviation between the set room pressure value and the measured room pressure value exceeds a certain deviation reference value occurs or before a second predetermined time elapses since the deviation has been removed.

The room pressure control system may further include a fume hood provided in the target room; a local exhaust valve that adjusts an exhaust air volume from the fume hood; and a local exhaust air volume adjusting unit that controls the local exhaust valve so that a face velocity of a sash of the fume hood has a predetermined value. The air volume control unit may control the air supply valve and the general exhaust valve so that a difference between the supply air volume adjusted by the air supply valve and the exhaust air volume adjusted by the local exhaust valve and the general exhaust valve coincides with the set offset air volume value.

In the room pressure control system, the room pressure ease-of-fluctuation determination unit may determine that the room pressure easily fluctuates if at least one of the conditions (1) to (3) and a condition (4) while a local exhaust air volume adjusted by the local exhaust valve is being changed or before a third predetermined time elapses since the local exhaust air volume has been changed is established.

According to an embodiment of the present disclosure, a room pressure control method includes determining a supply air volume from an air supply valve provided in a target room and an exhaust air volume from a general exhaust valve provided in the target room and controls the air supply valve and the general exhaust valve so that a difference between the supply air volume adjusted by the air supply valve and the exhaust air volume adjusted by the general exhaust valve coincides with a set offset air volume value; controlling the valve operating as a room pressure control valve, between the air supply valve and the general exhaust valve, so that a room pressure, which is a difference in pressure between the target room and a certain reference room, coincides with a set room pressure value; determining whether the room pressure easily fluctuates; determining —7—whether the room pressure is stable; and setting dead zone parameters used to determine stability of the room pressure. The setting includes setting a dead zone parameter with which responsiveness of room pressure control is valued above reduction in the number of operations of the room pressure control valve if it is determined that the room pressure easily fluctuates and setting a dead zone parameter with which the reduction in the number of operations of the room pressure control valve is valued above the responsiveness of the room pressure control if it is determined that the room pressure does not easily fluctuate. The controlling includes holding change in the air volume for the room pressure control if it is determined that the room pressure is stable.

According to the present disclosure, the dead zone parameters are switched between the state in which the room pressure easily fluctuates and the state in which the room pressure hardly fluctuates. When the room pressure easily fluctuates, the stability of the room pressure is determined using the dead zone parameters with which the responsiveness of the room pressure control is valued above the reduction in the number of operations of the room pressure control valve. Accordingly, the responsiveness of the control to the fluctuation of the room pressure is improved. In contrast, when the room pressure does not easily fluctuate, the stability of the room pressure is determined using the dead zone parameters with which the reduction in the number of operations of the room pressure control valve is valued above the responsiveness of the room pressure control. Accordingly, the number of operations of the room pressure control valve is reduced and the lifetime of the room pressure control valve is increased. Accordingly, it is possible to achieve both the increase in the lifetime of the room pressure control valve and the responsiveness of the room pressure control.

Figure 1:
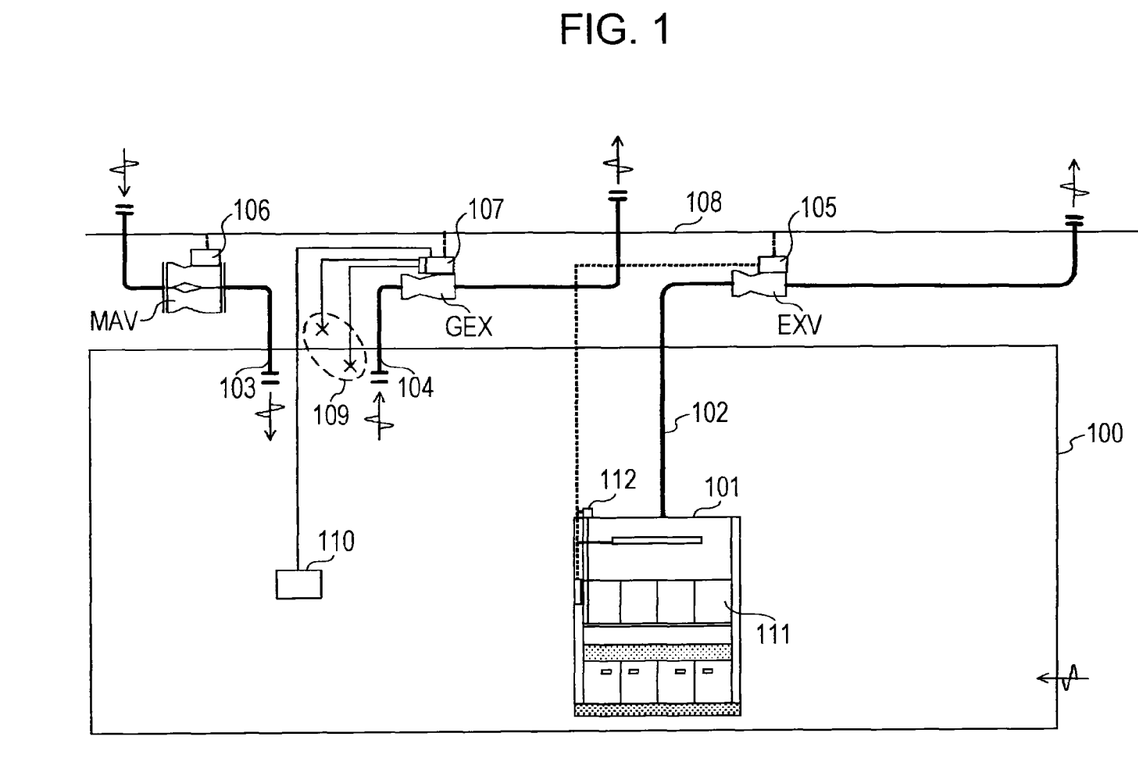
FIG. 1 illustrates an exemplary configuration of a room pressure control system according to an embodiment of the present disclosure.

Embodiments of the present disclosure will herein be described with reference to the attached drawings. FIG. 1 illustrates an exemplary configuration of a room pressure control system according to an embodiment of the present disclosure. The room pressure control system of the present embodiment includes a fume hood 101 provided in a room 100; a local exhaust duct 102 connected to the fume hood 101; an air supply duct 103 that supplies air to the room 100; a general exhaust duct 104 that exhausts the air in the room 100; a local exhaust valve EXV that adjusts the air volume in the local exhaust duct 102; an air supply valve MAV that adjusts the air volume in the air supply duct 103; a general exhaust valve GEX that adjusts the air volume in the general exhaust duct 104; a controller unit 105 that controls the local exhaust valve EXV; a controller unit 106 that controls the air supply valve MAV: a controller unit 107 that controls the general exhaust valve GEX; a communication line 108 via which the controller units 105, 106, and 107 are connected to each other; a differential pressure sensor 109 that measures a room pressure, which is the difference in pressure between the room 100 and a certain reference room (the space outside the room 100 in the present embodiments; and a room pressure monitor 110 used to check the pressure difference. The fume hood 101 includes a sash 111 that is capable of being opened and closed and a sash sensor 112 that detects the degree of opening of the sash 111.

Figure 2:
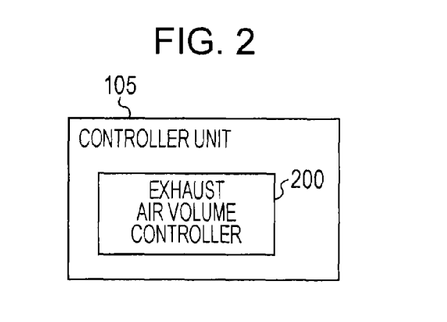
FIG. 2 is a block diagram illustrating an exemplary configuration of a local exhaust controller unit according to the embodiment of the present disclosure.
Figure 3:
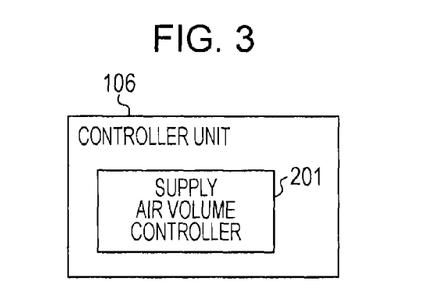
FIG. 3 is a block diagram illustrating an exemplary configuration of an air supply controller unit according to the embodiment of the present disclosure.
Figure 4:
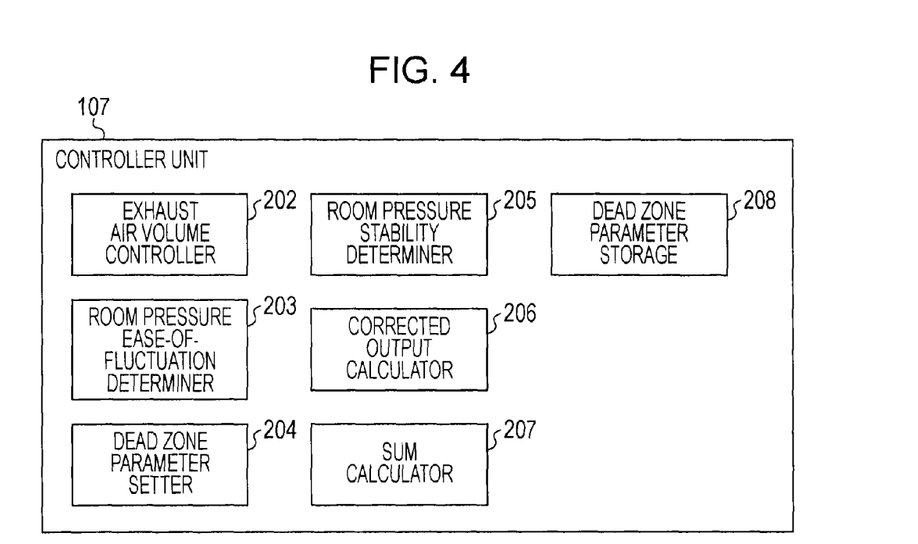
FIG. 4 is a block diagram illustrating an exemplary configuration of a general exhaust controller unit according to the embodiment of the present disclosure.

FIG. 2 is a block diagram illustrating an exemplary configuration of the controller unit 105. FIG. 3 is a block diagram illustrating an exemplary configuration of the controller unit 106. FIG. 4 is a block diagram illustrating an exemplary configuration of the controller unit 107.

The controller unit 105 includes an exhaust air volume controller 200 that controls the local exhaust valve EXV.

The controller unit 106 includes a supply air volume controller 201 that controls the air supply valve MAV.

The controller unit 107 includes an exhaust air volume controller 202, a room pressure ease-of-fluctuation determiner 203, a dead zone parameter setter 204, a room pressure stability determiner 205, a corrected output calculator 206, a sum calculator 207, and a dead zone parameter storage 208. The exhaust air volume controller 202 controls the general exhaust valve GEX. The room pressure ease-of-fluctuation determiner 203 determines whether the room pressure easily fluctuates. The dead zone parameter setter 204 sets dead zone parameters used to determine the stability of the room pressure. The room pressure stability determiner 205 determines whether the room pressure is stable. The corrected output calculator 206 calculates a corrected control output value for the valve operating as a room pressure control valve, among the air supply valve MAV and the general exhaust valve GEX, on the basis of the room pressure measured by the differential pressure sensor 109 and a set room pressure value. The sum calculator 207 calculates the sum of a control output value corresponding to the valve operating as the room pressure control valve and the corrected control output value and supplies the calculated sum to the room pressure control valve. The dead zone parameter storage 208 stores in advance a dead zone parameter with which responsiveness of the room pressure control is valued above the reduction in the number of operations of the room pressure control valve and a dead zone parameter with which the reduction in the number of operations of the room pressure control valve is valued above the responsiveness of the room pressure control.

The exhaust air volume controller 200 in the controller unit 105 composes a local exhaust air volume adjusting unit. The supply air volume controller 201 in the controller unit 106 and the exhaust air volume controller 202 in the controller unit 107 compose an air volume control unit. The corrected output calculator 206 and the sum calculator 207 in the controller unit 107 compose a room pressure correction control unit.

Although the room pressure ease-of-fluctuation determiner 203, the dead zone parameter setter 204, the room pressure stability determiner 205, the corrected output calculator 206, the sum calculator 207, and the dead zone parameter storage 208 are provided in the controller unit 107 in the present embodiment, the present embodiment is not limited to this. The room pressure ease-of-fluctuation determiner 203, the dead zone parameter setter 204, the room pressure stability determiner 205, the corrected output calculator 206, the sum calculator 207, and the dead zone parameter storage 208 may be provided in another controller or a central monitoring unit (not illustrated).

An air volume control operation in normal times, which is performed by the room pressure control system, will now be described. Here, the air volume of the supply air blown into the room 100 through the air supply duct 103 is denoted by Vmav, the air volume of the exhaust air blown out from room 100 through the general exhaust duct 104 is denoted by Vgex, and the air volume of the exhaust air blown out from the room 100 through the local exhaust duct 102 is denoted by Vexv.

The exhaust air volume controller 200 in the controller unit 105 determines the exhaust air volume Vexv so that the face velocity of the sash has a predetermined value (normally 0.5 m/s) on the basis of the area of the opening of the sash of the fume hood 101 and controls the degree of opening of the local exhaust valve EXV so that the local exhaust duct 102 has the exhaust air volume Vexv. The area of the opening of the sash of the fume hood 101 is determined by multiplying the height of the opening of the sash 111, which is calculated from the degree of opening of the sash detected by the sash sensor 112, by a known sash width.

The exhaust air volume controller 202 in the controller unit 107 varies the exhaust air volume Vgex by the amount of the variation in the exhaust air volume Vexv caused by the opening and closing of the sash so that a total exhaust air volume (Vgex+Vexv) is kept constant and calculates the control output value so that the general exhaust duct 104 has the exhaust air volume Vgex to control the degree of opening of the general exhaust valve GEX.

The supply air volume controller 201 in the controller unit 106 determines the supply air volume Vmav so that at least a minimum air volume is constantly blown into the room 100 through the air supply valve MAV in order to meet a minimum amount of ventilation of the room 100 and calculates the control output value so that the air intake duct 103 has the supply air volume Vmav to control the degree of opening of the air supply valve MAV. In order to ensure the minimum amount of ventilation of the room 100, the supply air volume Vmav is set to a value higher than or equal to the minimum amount of ventilation.

With the above method of setting the air volume, Equation (1) is established when the fume hood 101 is not used (that is, the sash 111 is fully opened):

$$Vmav = Vgex + \alpha \quad (1)$$

A constant $\alpha$ is a set offset air volume value used to determine the air volume leaking from the room 100 and to determine whether the pressure of the room 100 is to set a positive pressure or a negative pressure.

Next, Equation (2) is established when the fume hood 101 is used:

$$Vmav = Vgex + Vexv + \alpha \quad (2)$$

For example, when the exhaust air volume Vexv is increased to a maximum air volume (Vexv)max, the exhaust air volume controller 202 in the controller unit 107 decreases the exhaust air volume Vgex to attempt to keep the balance of the air volume. However, it is not possible to further decrease the exhaust air volume Vgex if the degree of opening of the general exhaust valve GEX is Oo when the controller unit 107 attempts to keep the balance of the air volume only with the operation of decreasing the exhaust air volume Vgex. In such a case, the supply air volume controller 201 in the controller unit 106 adjusts the supply air volume Vmav so as to establish Equation (3):

$$Vmav = Vgex + (Vexv)max + \alpha \quad (3)$$

With the above air volume control operation, when the exhaust air volume Vexv is varied in response to opening or closing of the sash 111 of the fume hood 101, the supply air volume Vmav and the exhaust air volume Vgex are varied with the variation in the exhaust air volume Vexv.

An air volume switching control operation is exemplified as another example in which the supply air volume Vmav and the exhaust air volume Vgex are changed. In the air volume switching control operation, the supply air volume Vmav and the exhaust air volume Vgex are decreased while the difference in pressure between the inside of a room and the outside thereof is kept constant for energy saving in a time period, such as night or a holiday, when no person exists and no operation is performed. The change of the air volume is performed every weekday. In an example of switching from daytime to night, both the supply air volume Vmav and the exhaust air volume Vgex are gradually decreased. In an example of switching from night to daytime, both the supply air volume Vmav and the exhaust air volume Vgex are gradually increased.

An change operation in response to, for example, an instruction to change the amount of ventilation in a room is exemplified as another example in which the supply air volume Vmav and the exhaust air volume Vgex are changed. The supply air volume Vmav and the exhaust air volume Vgex are changed also in a case in which air supply and exhaust fans are stopped in fumigation of the room or when the room is not used and a case in which a state in which the air supply and exhaust fans are stopped is switched to a state in which the air supply and exhaust fans are normally operated.

Figure 5:
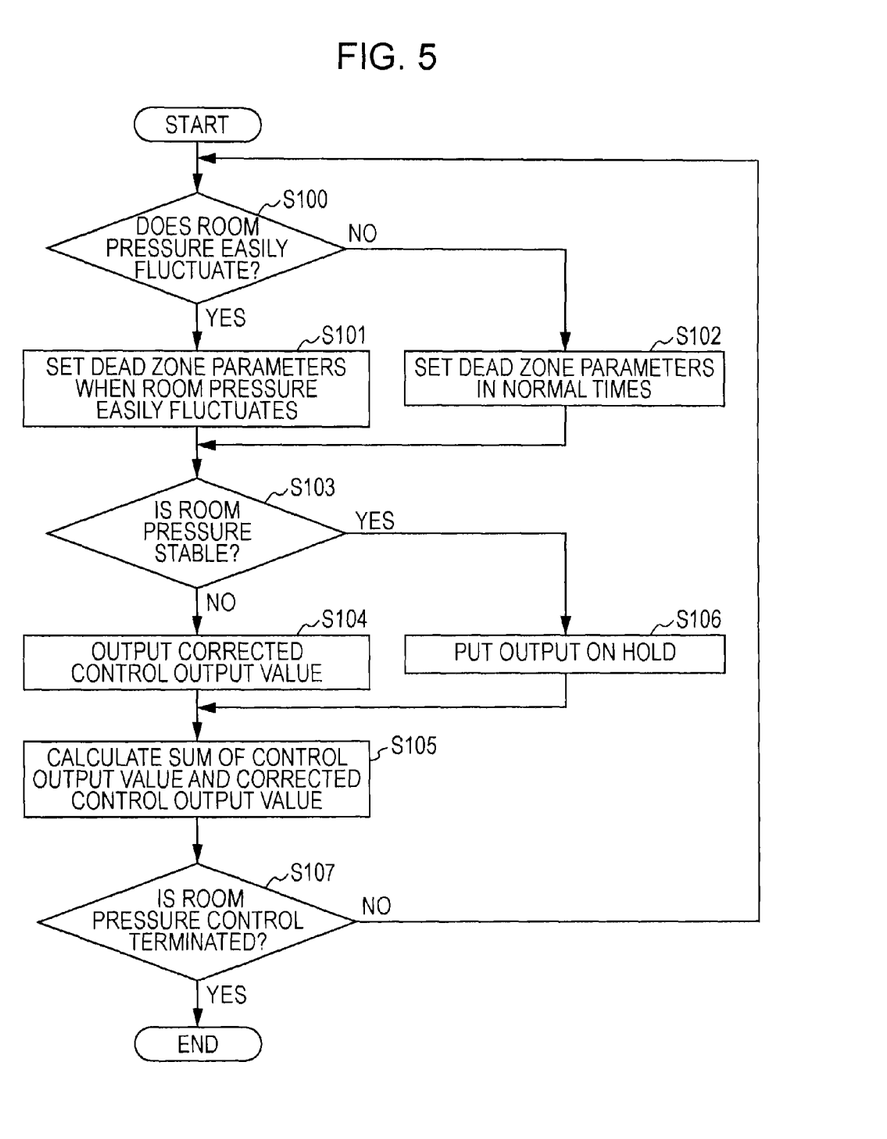
FIG. 5 is flowchart illustrating an exemplary room pressure control operation according to the embodiment of the present disclosure.

A room pressure control operation performed in parallel with the above operations will now be described. FIG. 5 is a flowchart illustrating an exemplary room pressure control operation. In the present embodiment, the general exhaust valve GEX is operated as a room pressure control valve (PCV).

Referring to FIG. 5, in Step S100, the room pressure ease-of-fluctuation determiner 203 in the controller unit 107 determines whether any condition in which the room pressure easily fluctuates is established to determine whether the room pressure easily fluctuates.

The conditions in which the room pressure easily fluctuates include:

(A) While the supply air volume Vmav or the exhaust air volume Vgex is being changed, (B) Before a first predetermined time T1 elapses after the room pressure control is started, (C) A measured room pressure value is deviated from the set room pressure value or before a second predetermined time T2 elapses since the deviation has been removed, and (D) While the exhaust air volume Vexv is being changed or before a third predetermined time T3 elapses since the exhaust air volume Vexv has been changed.

The room pressure ease-of-fluctuation determiner 203 determines that the room pressure easily fluctuates if at least one of (A) to (D) is established. The room pressure ease-of-fluctuation determiner 203 determines that the room pressure does not easily fluctuate if none of (A) to (D) is established.

The first predetermined time T1, the second predetermined time T2, and the third predetermined time T3 are capable of being individually set. As for the condition (C), it is determined that a measured room pressure value dPE is deviated from a set room pressure value SP if the absolute value |SP−dPE| of a deviation between the set room pressure value SP and the measured room pressure value dPE measured by the differential pressure sensor 109 exceeds a certain deviation reference value SW and it is determined that the deviation is removed if the absolute value |SP−dPE| of the deviation is lower than or equal to the deviation reference value SW.

If the room pressure ease-of-fluctuation determiner 203 determines that the room pressure easily fluctuates (YES in Step S100), in Step S101, the dead zone parameter setter 204 in the controller unit 107 reads out dead zone parameters (a dead zone width W and a deviation time t) when the room pressure easily fluctuates from the dead zone parameter storage 208 and sets the dead zone parameters that are read out in the room pressure stability determiner 205.

If the room pressure ease-of-fluctuation determiner 203 determines that the room pressure does not easily fluctuates (NO in Step S100), in Step S102, the dead zone parameter setter 204 reads out dead zone parameters in normal times from the dead zone parameter storage 208 and sets the dead zone parameters that are read in the room pressure stability determiner 205. For example, the dead zone width W is set to 3 Pa and the deviation time t is set to 0 s in the dead zone parameters when the room pressure easily fluctuates. For example, the dead zone width W is set to 4.5 Pa and the deviation time t is set to 30 s in the dead zone parameters in normal times. As described above, the dead zone parameters optimal for the situation in which the room pressure easily fluctuates and the dead zone parameters optimal for the situation in which the room pressure hardly fluctuates are registered in the room pressure stability determiner 205 in advance.

The deviation reference value SW described above is greater than the dead zone width W and is set to, for example, 15 Pa. In other words, as described below, since the fluctuation in the room pressure naturally disappears in a case in which the absolute value |SP−dPE| of the deviation is slightly deviated from the dead zone width W while the room pressure control is held, the control is continuously held. However, when the room pressure is greatly fluctuated for any reason, the holding of the room pressure control should be immediately cancelled without waiting for expiration of the deviation time t to restart the room pressure control. Accordingly, the deviation reference value SW greater than the dead zone width W is set and, if the absolute value |SP−dPE| of the deviation exceeds the deviation reference value SW, it is determined that the room pressure easily fluctuates and the dead zone parameters are switched.

In Step S103, the room pressure stability determiner 205 in the controller unit 107 determines whether the room pressure is stable. The room pressure stability determiner 205 determines that the room pressure is stable if the absolute value |SP−dPE| of the deviation between the set room pressure value SP and the measured room pressure value dPE measured by the differential pressure sensor 109 is—20—lower than or equal to the dead zone width W and determines that the room pressure is being varied if the state in which the absolute value |SP−dPE| of the deviation exceeds the dead zone width W continues for a time exceeding the deviation time t.

If the room pressure stability determiner 205 determines that the room pressure is being varied (NO in Step S103), in Step S104, the corrected output calculator 206 in the controller unit 107 calculates an amount of variation in the exhaust air volume Vgex using a known proportional-integral-derivative (PID) control algorithm so that the deviation between the set room pressure value SP and the measured room pressure value dPE is removed and calculates the corrected control output value so that the exhaust air volume Vgex of the general exhaust duct 104 is varied by the calculated amount of variation.

In Step S105, the sum calculator 207 in the controller unit 107 calculates the sum of the exhaust control output value output from the exhaust air volume controller 202 and the corrected control output value output from the corrected output calculator 206 and supplies the calculated sum to the general exhaust valve GEX. Fine-tuning of the degree of opening of the general exhaust valve GEX through the room pressure control operation is performed simultaneously with the adjustment of the degree of opening of the general exhaust valve GEX through the air volume control operation in the above manner to control the room pressure.

If the room pressure stability determiner 205 determines that the room pressure is stable (YES in Step S103), in Step S106, the corrected output calculator 206 holds the output of the corrected control output value calculated using the PID control algorithm and continuously outputs the corrected control output value that has been output in the last calculation cycle until a new corrected control output value is output in a calculation cycle subsequent to the current calculation cycle.

If the room pressure is stable, holding the output of the corrected control output value to hold the room pressure control allows the operation of the general exhaust valve GEX to be stopped, thereby decreasing the number of operations of the general exhaust valve GEX. Since the new corrected control output value is calculated and output in Step S104 if the room pressure stability determiner 205 determines that the room pressure is being varied, the holding of the room pressure control is cancelled and the room pressure control is restarted.

In Step S107, it is determined whether the room pressure control is terminated. Steps S100 to S106 are repeated for every calculation cycle until the room pressure control is terminated (YES in Step S107).

Figure 6:
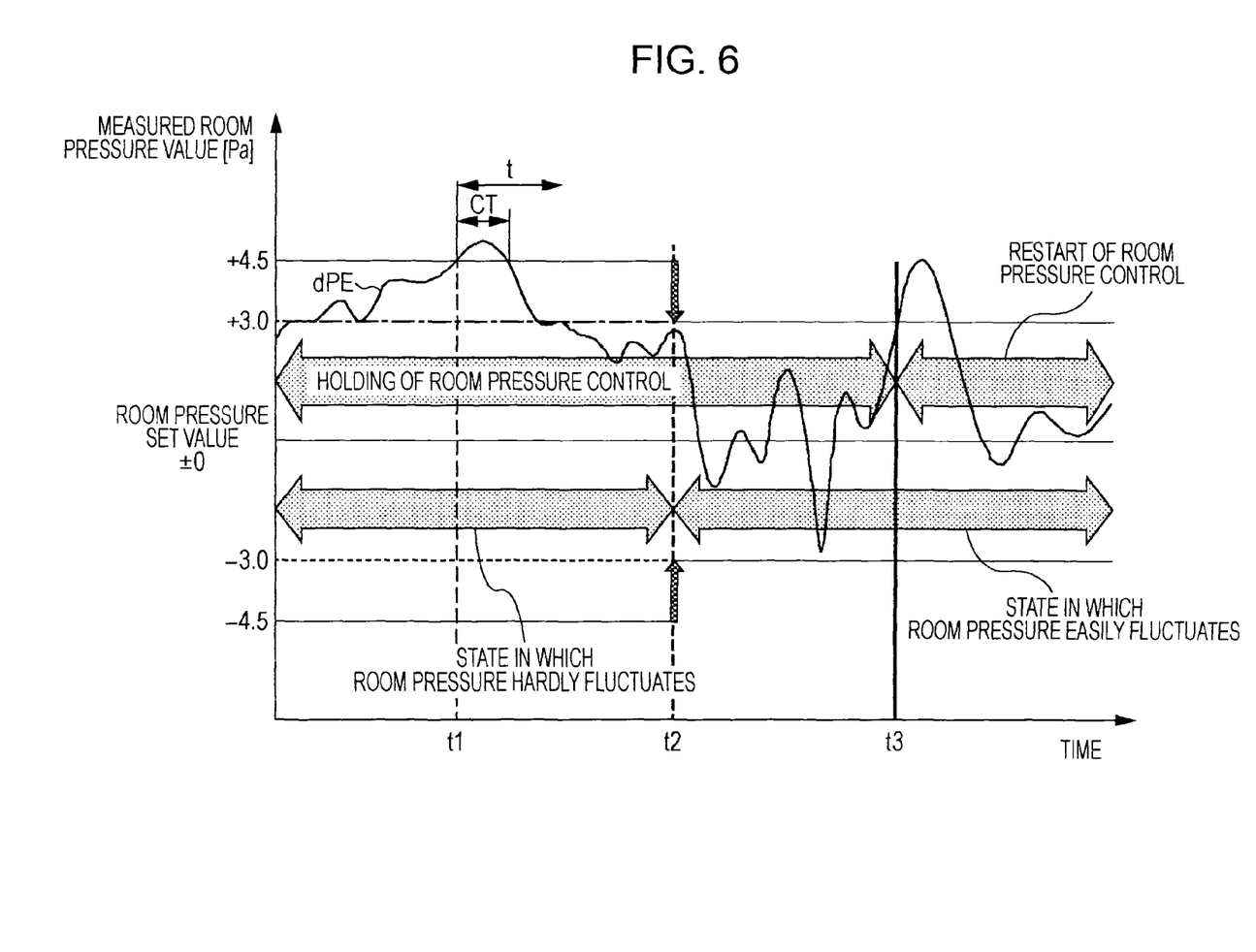
FIG. 6 illustrates an example of the room pressure control operation according to the embodiment of the present disclosure.

FIG. 6 illustrates an example of the room pressure control operation in the present embodiment. When the room pressure does not easily fluctuates, the dead zone width W=4.5 Pa and the deviation time t=30 s are set as the dead zone parameters in normal times. It is assumed that any fluctuation in room pressure occurs in this state and the absolute value |SP−dPE| of the deviation between the set room pressure value SP and the measured room pressure value dPE exceeds the dead zone width W=4.5 Pa at a time t1. In this case, if a continuation time CT of the state in which the absolute value |SP−dPE| of the deviation exceeds the dead zone width W is shorter than or equal to the deviation time t, the room pressure control is continuously held and unnecessary operations of the room pressure control valve (PCV) (the general exhaust valve GEX) are eliminated while the room pressure is stable, as illustrated in FIG. 6.

It is assumed here that the amount-of-ventilation change instruction is issued and the supply and exhaust air volumes start to vary at a time t2. Here, the room pressure ease-of-fluctuation determiner 203 determines that the room pressure easily fluctuates and the dead zone parameter setter 204 sets the dead zone width W=3 Pa and the deviation time t=0 s as the dead zone parameters when the room pressure easily fluctuates. It is assumed that the fluctuation in the room pressure occurs in this state and the absolute value |SP−dPE| of the deviation between the set room pressure value SP and the measured room pressure value dPE exceeds the dead zone width W=3 Pa at a time t3. Since the deviation time t has been changed to 0 s in this case, it is immediately determined that the room pressure is being varied and the room pressure control is restarted without holding the room pressure control.

As described above, in the present embodiments, the dead zone parameters are switched between the state in which the room pressure easily fluctuates and the state in which the room pressure hardly fluctuates. When the room pressure easily fluctuates, the stability of the room pressure is determined using the dead zone parameters with which the responsiveness of the room pressure control is valued above the reduction in the number of operations of the general exhaust valve GEX (the dead zone width W is narrower and the deviation time t is shorter than the dead zone parameters in normal times). Accordingly, compared with the technologies disclosed in Japanese Unexamined Patent Application Publication No. 2006-153325 and Japanese Unexamined Patent Application Publication No. 2012-237527, the responsiveness of the control to the fluctuation of the room pressure is improved. In contrast, when the room pressure does not easily fluctuates, the stability of the room pressure is determined using the dead zone parameters with which the reduction in the number of operations of the general exhaust valve GEX is valued above the responsiveness of the room pressure control (the dead zone width W is wider and the deviation time t is longer than the dead zone parameters in normal times). Accordingly, the number of operations of the general exhaust valve GEX is reduced and the lifetime of the general exhaust valve GEX is increased. In the present embodiments, it is possible to achieve both the increase in the lifetime of the room pressure control valve (PCV) (the general exhaust valve GEX) and the responsiveness of the room pressure control in the above manner.

Although the general exhaust valve GEX is caused to function as the room pressure control valve (PCV) in the present embodiments, the air supply valve MAV may be caused to function as the room pressure control valve (PCV). However, when the air supply valve MAV is caused to function as the room pressure control valve (PCV), the sum calculator 207 calculates the sum of the control output value output from the supply air volume controller 201 in the controller unit 106 and the corrected control output value output from the corrected output calculator 206 and supplies the calculated sum to the air supply valve MAV.

Each of the controller units 105, 106, and 107 described above in the present embodiments may be realized by a computer including, for example, a central processing unit (CPU), memories, and interfaces and programs that control these hardware resources. The CPU of each of the controller units 105, 106, and 107 performs the processes described above in the present embodiments in accordance with the programs stored in the memories.

Although the fume hood is exemplified as a local exhaust apparatus in the present embodiments, the local exhaust apparatus may be applied to an apparatus, such as a safety cabinet, having the same role as that of the fume hood.

The present disclosure is applicable to the room pressure control system.

What is claimed is:

1. A room pressure control system, comprising:
an air supply valve configured to adjust a volume of supply air to be blown into a target room;
a general exhaust valve configured to adjust a volume of exhaust air to be blown out from the target room;
an air volume control circuit configured to determine the supply air volume and the exhaust air volume and control the air supply valve and the general exhaust valve so that a difference between the supply air volume adjusted by the air supply valve and the exhaust air volume adjusted by the general exhaust valve coincides with a set offset air volume value; and
processing circuitry configured to
control a valve operating as a room pressure control valve, the valve being one of the air supply valve and the general exhaust valve, so that a room pressure, which is a difference between a pressure in the target room and a pressure in certain reference room, coincides with a set room pressure value;
determine whether the room pressure fluctuates;
determine whether the room pressure is stable; and
set parameters used to determine stability of the room pressure,
wherein the processing circuitry is further configured to set a first dead zone parameter with which responsiveness of room pressure control is valued above a reduction in a number of operations of the room pressure control valve when the processing circuitry determines that the room pressure fluctuates, and set a second dead zone parameter with which the reduction in the number of operations of the room pressure control valve is valued above the responsiveness of the room pressure control when the processing circuitry determines that the room pressure does not easily fluctuate, and
wherein the processing circuitry is further configured to maintain a change in air volume to control the room pressure when the processing circuitry determines that the room pressure is stable.

2. The room pressure control system according to claim 1, wherein the dead zone parameters include a dead zone width and a deviation time, and
wherein the processing circuitry is further configured to determine that the room pressure is stable when an absolute value of a deviation between the set room pressure value and a measured room pressure value is lower than or equal to the dead zone width, and determine that the room pressure is being varied when a continuation time, which is a time period during which the absolute value of the deviation exceeds the dead zone width, exceeds the deviation time.

3. The room pressure control system according to claim 2, wherein the dead zone width with which the responsiveness of the room pressure control is valued is narrower than the dead zone width with which the reduction in the number of operations of the room pressure control valve is valued, and the deviation time with which the responsiveness of the room pressure control is valued is shorter than the deviation time with which the reduction in the number of operations of the room pressure control valve is valued.

4. The room pressure control system according to claim 1, wherein the processing circuitry is further configured to determine that the room pressure fluctuates when at least one of a plurality of conditions is true, the plurality of conditions including (1) the supply air volume or the exhaust air volume is being changed, (2) before a first predetermined time elapses after the room pressure control is started, and (3) a deviation between the set room pressure value and a measured room pressure value exceeds a certain deviation reference value or before a second predetermined time elapses since the deviation has been removed.

5. The room pressure control system according to claim 1, further comprising:
a fume hood provided in the target room;
a local exhaust valve to adjust an exhaust air volume from the fume hood; and
a local exhaust air volume adjusting circuit configured to control the local exhaust valve so that a face velocity of a sash of the fume hood has a predetermined value,
wherein the air volume control circuit is further configured to control the air supply valve and the general exhaust valve so that a difference between the supply air volume adjusted by the air supply valve and the exhaust air volume adjusted by the local exhaust valve and the general exhaust valve coincides with the set offset air volume value.

6. The room pressure control system according to claim 4, wherein the processing circuitry is further configured to determine that the room pressure easily fluctuates when at least one of the conditions (1) to (3) and a condition (4) are true, the condition (4) being a local exhaust air volume adjusted by a local exhaust valve is being changed or before a third predetermined time elapses since the local exhaust air volume has been changed.

7. A room pressure control method, comprising:
determining a supply air volume from an air supply valve provided in a target room and an exhaust air volume from a general exhaust valve provided in the target room, and controlling the air supply valve and the general exhaust valve so that a difference between the supply air volume adjusted by the air supply valve and the exhaust air volume adjusted by the general exhaust valve coincides with a set offset air volume value;
controlling a room pressure control valve, arranged between the air supply valve and the general exhaust valve, so that a room pressure, which is a difference in between a pressure in the target room and a pressure in a certain reference room, coincides with a set room pressure value;
determining whether the room pressure fluctuates;
determining whether the room pressure is stable; and
setting dead zone parameters used to determine stability of the room pressure,
wherein the setting step comprises setting a first dead zone parameter with which responsiveness of room pressure control is valued above a reduction in a number of operations of the room pressure control valve when it is determined that the room pressure fluctuates, and setting a second dead zone parameter with which the reduction in the number of operations of the room pressure control valve is valued above the responsiveness of the room pressure control when it is determined that the room pressure does not easily fluctuate, and wherein the controlling step comprises maintaining a change in air volume to control the room pressure when it is determined that the room pressure is stable.

8. The room pressure control method of claim 7, wherein the dead zone parameters include a dead zone width and a deviation time, and the step of determining whether the room pressure is stable comprises determining that the room pressure is stable when an absolute value of a deviation between the set room pressure value and a measured room pressure value is lower than or equal to the dead zone width, and determining that the room pressure is being varied when a continuation time, which is a time period during which the absolute value of the deviation exceeds the dead zone width, exceeds the deviation time.

9. The room pressure control method of claim 8, wherein the dead zone width with which the responsiveness of the room pressure control is valued is narrower than the dead zone width with which the reduction in the number of operations of the room pressure control valve is valued, and the deviation time with which the responsiveness of the room pressure control is valued is shorter than the deviation time with which the reduction in the number of operations of the room pressure control valve is valued.

10. The room pressure control method of claim 7, wherein the step of determining whether the room pressure easily fluctuates comprises determining that the room pressure fluctuates when at least one of a plurality of conditions is true, the plurality of conditions including (1) the supply air volume or the exhaust air volume is being changed, (2) before a first predetermined time elapses after the room pressure control is started, and (3) a deviation between the set room pressure value and a measured room pressure value exceeds a certain deviation reference value or before a second predetermined time elapses since the deviation has been removed.

11. The room pressure control method of claim 10, wherein the step of determining whether the room pressure fluctuates comprises determining that the room pressure easily fluctuates when at least one of the conditions (1) to (3) and a condition (4) are true, the condition (4) being a local exhaust air volume adjusted by a local exhaust valve is being changed or before a third predetermined time elapses since the local exhaust air volume has been changed.

* * * * *